United States Patent [19]
Hartzell

[11] Patent Number: 5,268,100
[45] Date of Patent: Dec. 7, 1993

[54] MANURE SEPARATOR

[76] Inventor: Kirk Hartzell, P.O. Box 357, Chattaroy, Wash. 99003-0357

[21] Appl. No.: 831,936

[22] Filed: Feb. 6, 1992

[51] Int. Cl.$^5$ .................. B01D 29/88; B01D 29/64; B01D 29/01; B01D 35/34
[52] U.S. Cl. .................. 210/396; 210/397; 210/413; 210/414; 210/498; 209/242; 209/262; 209/273
[58] Field of Search .............. 210/413, 414, 408, 396, 210/397, 498; 209/273, 352, 262, 241, 242

[56] References Cited

U.S. PATENT DOCUMENTS

| 955,843 | 4/1910 | Bossert | 210/413 |
|---|---|---|---|
| 2,845,180 | 7/1958 | McAfee | 210/413 |
| 2,865,509 | 12/1958 | Harlan | 210/414 |
| 2,919,806 | 1/1960 | Hock | 210/414 |
| 3,864,255 | 2/1975 | Swanson | 210/67 |
| 3,950,562 | 4/1976 | Senior | 426/431 |
| 3,959,135 | 5/1976 | Shattock | 210/77 |
| 4,419,239 | 12/1983 | Frankl | 210/413 |
| 4,661,253 | 4/1987 | Williams | 210/413 |
| 4,666,602 | 5/1987 | Hartzell | 210/298 |
| 4,731,180 | 3/1988 | Huff | 210/413 |
| 4,826,589 | 5/1989 | Hirs | 210/413 |
| 5,013,430 | 5/1991 | Mileson | 210/413 |
| 5,156,749 | 10/1992 | Williams | 210/232 |
| 5,171,436 | 12/1992 | Botsch | 210/413 |

FOREIGN PATENT DOCUMENTS

| 138764 | 11/1979 | Fed. Rep. of Germany . | |
| 776628 | 11/1980 | U.S.S.R. . | |
| 1165252 | 7/1985 | U.S.S.R. | 210/413 |
| 1297742 | 3/1987 | U.S.S.R. | 210/413 |

Primary Examiner—Thomas M. Lithgow
Attorney, Agent, or Firm—Wells, St. John, Roberts, Gregory & Matkin

[57] ABSTRACT

A manure separating apparatus includes a trough with angularly bottom surfaces that converge downwardly to a discharge opening. A drain screen is located above the bottom trough surfaces and includes somewhat similarly angled downward converging infeed and discharge surfaces. The infeed section of the drain screen is approximately twice as long and at a smaller angle to the horizontal than the discharge screen section. A manure/liquid slurry may be introduced at a top infeed end of the screen and moved downwardly along the infeed section of the screen by a paddle conveyor. Separation of solids occurs primarily along the infeed screen section. The slurry is then moved angularly upwardly along the discharge section of the screen for final dewatering. The discharge section is spaced above the trough bottom to avoid liquids on the trough bottom below to facilitate dewatering of the solids before discharge. Movement is influenced by the paddle conveyor which has a working flight powered to move and scrape along the drain screen sections from the infeed end of the trough from its discharge end. In combining prescribed infeed and discharge sections of the screen in a single trough with operation of the paddle conveyor, a high degree of separation and dewatering efficiency is obtained without requiring a significant dimension along the path of travel for the slurry.

19 Claims, 3 Drawing Sheets

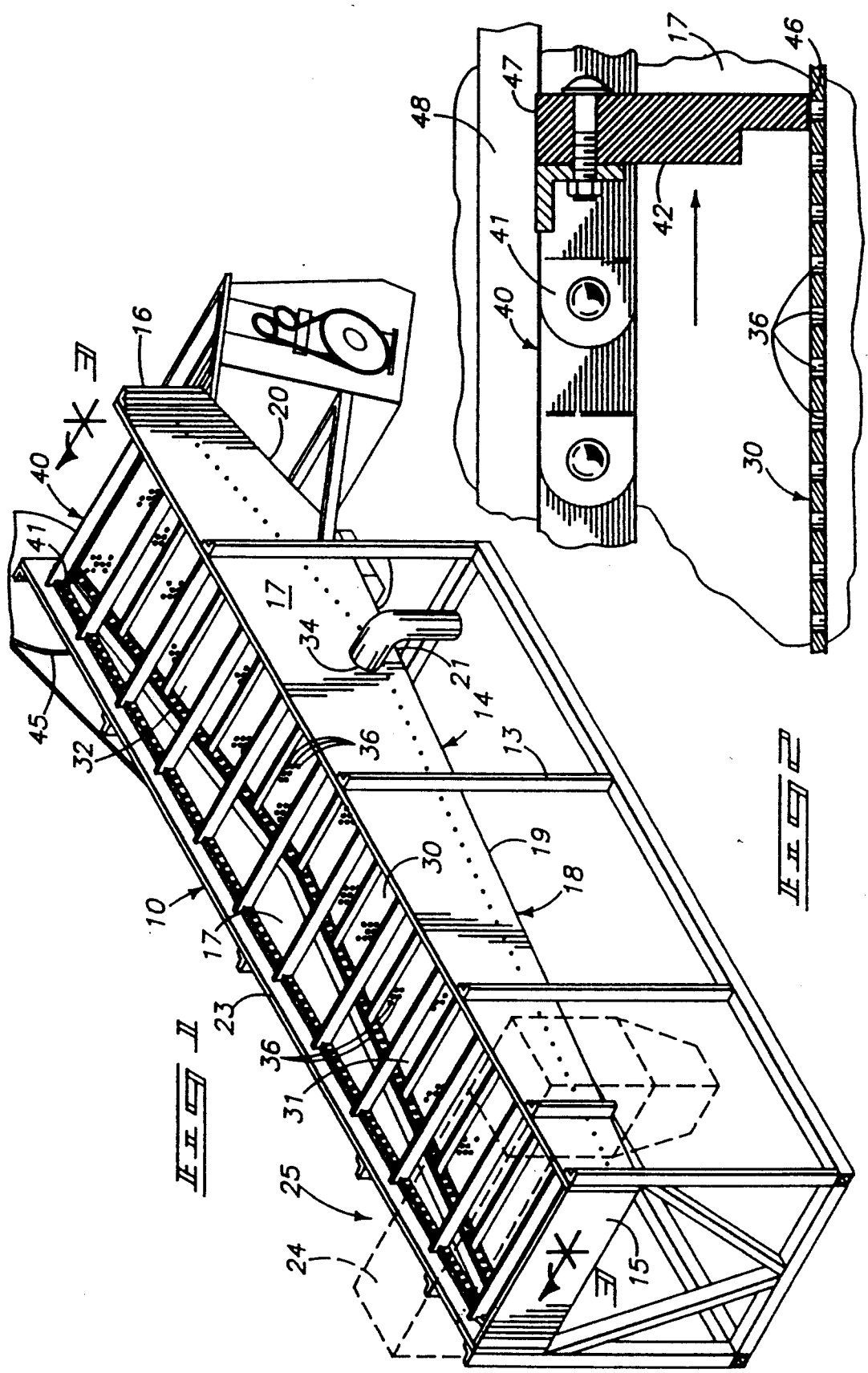

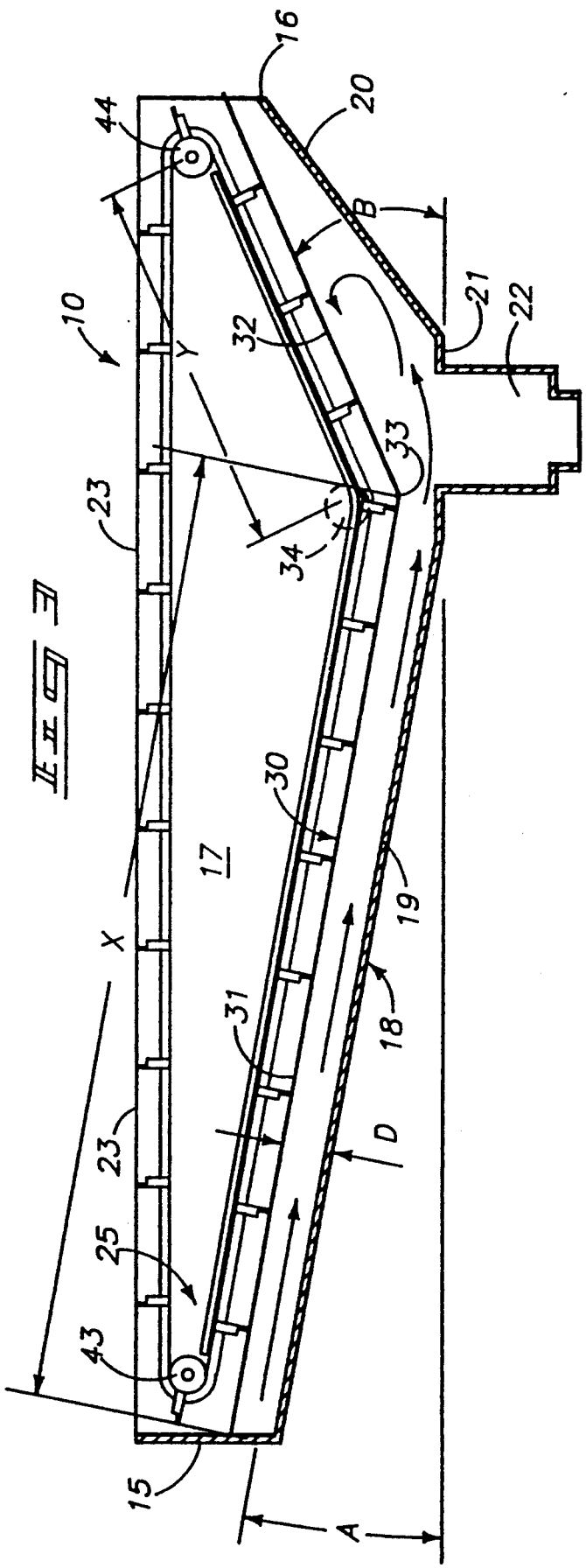

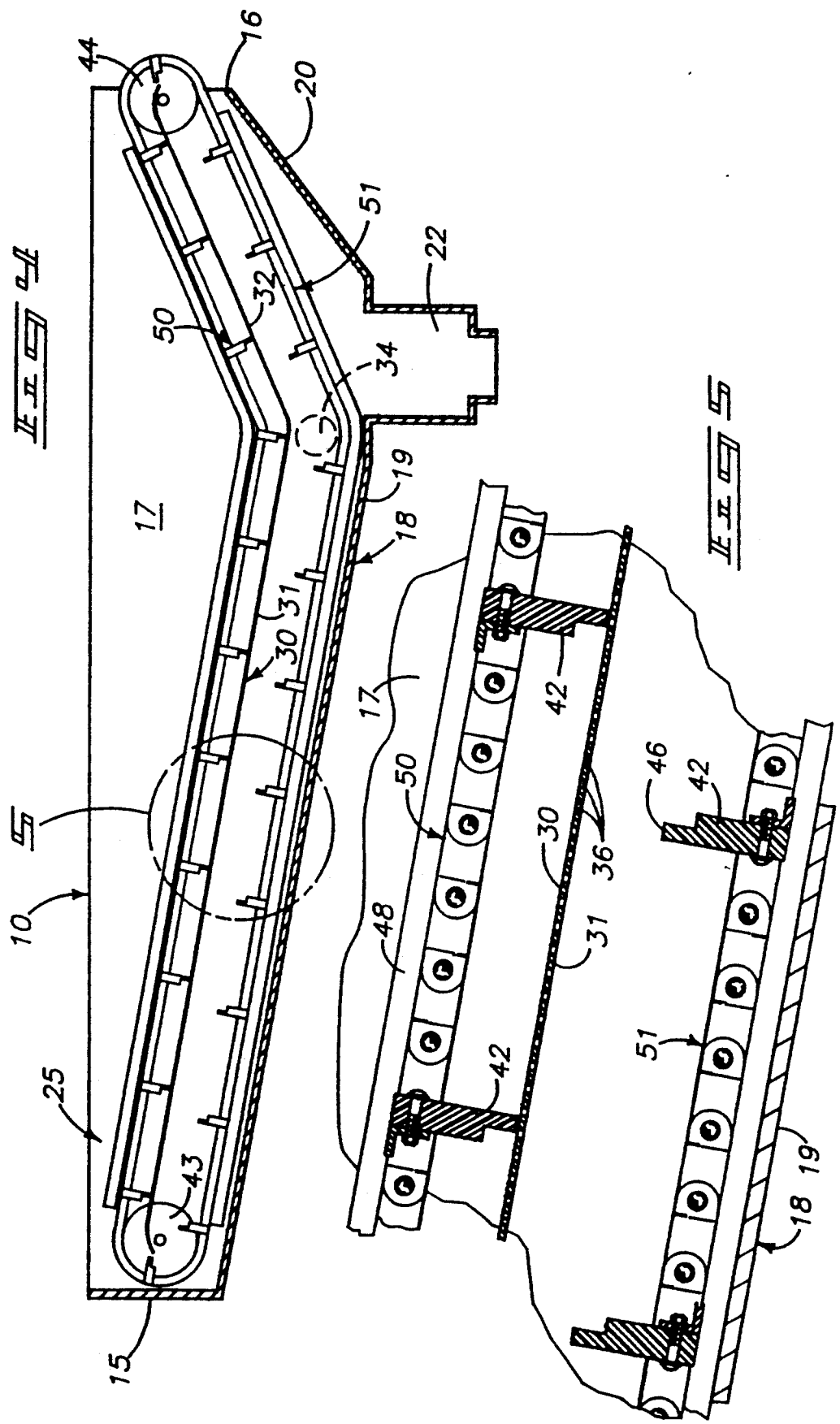

MANURE SEPARATOR

FIELD OF THE INVENTION

The present invention relates to separation of solids from liquids in manure and other solid and liquid waste handling systems.

BACKGROUND OF THE INVENTION

Many modern livestock handling facilities, especially dairies and feed lots, include a system by which animal wastes are collected. A popular method of collecting waste and cleaning livestock holding areas, such as barn floors, involves flushing the floor with water under pressure. The resulting slurry of water and waste is then directed to a holding tank or lagoon to await further processing. Removal of waste by this process is satisfactory and several forms of apparatus have been utilized for collecting and moving the waste material from the floor surfaces. However, equipment for separating the solids from liquids within the slurry has not been adequately developed, especially to an extent where large volumes of waste are to be handled.

The present Applicant's prior patent, U.S. Pat. No. 4,666,602, very serviceably handles and separates such slurries. The apparatus includes an elongated flume and a chain conveyor arrangement with paddles that move about a circuit within a plane along the perforated bottom surface of the flume. The paddles move about a circuit that is inclined with the flume such that one flight of the paddles moves in an upward direction on one side of the flume, and a return flight of equal length moves downwardly on an opposite side of the flume. A slurry is delivered to this apparatus and is moved about the circuit, in which the liquids separate from the solids and are collected in a drainage area toward the bottom end of the flume. The separated solids are then discharged to a press roll which further dries the separated solids.

The above apparatus operates efficiently, even in large volume conditions. However, it has been found that considerably more separation occurs on the "downside" of the conveyor in which the paddles are moving downwardly along the incline. Conversely, relatively little separation occurs on the upward side. Thus, a significant portion of the chain travel in the upward direction is unused. The conclusion is that the overall length dimension of the separator in the '602 patent is not necessary to the separating process. The problem then becomes how to provide a separator in which the usage of the separation draining screen is most effectively utilized in the minimum amount of space.

U.S. Pat. No. 3,864,255 discloses an inclined conveyor but does not utilize scrapers. The apparatus uses a pre-screen separator and a roller at the vertex of the converging inclined conveyor flight sections. Separation from a slurry occurs upstream of the conveyor through an inclined screen. Significantly separated material then drops on the conveyor belt which moves downwardly to a press roller and subsequently upwardly on an inclined portion of the conveyor to a discharge.

U.S. Pat. No. 3,950,562 to Senior discloses an apparatus for removing ash and inorganic compounds from cattle manure. This device makes use of an inclined conveyor having a series of longitudinally spaced baffles on its working flight that are powered to move toward the upward end of the conveyor. A slurry is discharged onto the working flight of the conveyor so the liquids will cascade over the baffles while the solids are carried upwardly to a discharge end of the conveyor. The separation is therefore attempted along the bottom surface of the moving conveyor flight as the flight moves angularly upward.

U.S. Pat. No. 3,959,135 to Shattock discloses an apparatus for dewatering manure slurries that also makes use of an endless belt dewatering screen. However, a press roll is utilized to "wring" moisture from the solids on the screen. The screen is held substantially horizontal and is moved to bring the solids in the slurry into contact between the two press rolls.

A 1979 East German patent document 1,838,764 discloses a manure separator including an inclined adjustable screen box with a fixed screen along a top surface thereof. A slurry of liquid and manure is delivered to a top edge of the screen and is allowed to run downwardly over the screen surface. A conveyor with flights having outwardly projecting brush bristles is positioned above the screen with its working flight moving in an upward direction to run against the direction of flow and keep the screen clean.

Russian Patent 776628 of 1980 discloses a filtering screen in which a horizontal screen is provided and in which scrapers are moved over the screen surface to squeeze liquid from the solids.

An apparatus somewhat similar to the device used in the Russian reference above is disclosed in U.S. Pat. No. 4,419,239. However, this apparatus makes use of a downwardly inclined screen used with pushing paddles along the surface of the screen to separate excess liquid from solid materials delivered to the screen.

As will be more fully understood below, the present apparatus is distinguishable over the known prior separation apparatus by its inclusion of an extent of separation screen that is inclined from opposed directions so that a manure/liquid slurry may be introduced at a top infeed end of the screen and moved downwardly along an infeed section of the screen. Various relationships are disclosed to maximize separation in a minimum distance. A slurry is first exposed to initial separation along a downwardly oriented section of a drain screen, and is then moved upwardly along a discharge section of the screen for final dewatering. Movement influenced by a paddle conveyor having a working flight powered to move and scrape along the drain screen sections from the infeed end of the trough from its discharge end. In combining the downward infeed and discharge sections of the screen in a single trough, in the relationships disclosed herein, a high degree of separation and dewatering efficiency is obtained without requiring a significant dimension along the path of travel for the slurry to accomplish this result.

BRIEF DESCRIPTION OF THE DRAWINGS

Preferred embodiments of the invention are illustrated in the accompanying drawings in which:

FIG. 1 is a perspective view of a first preferred manure separator incorporating features of the present invention;

FIG. 2 is an enlarged detail view of a single paddle and the adjacent drain screen in sectional view;

FIG. 3 is a section taken substantially along line 3—3 in FIG. 1;

FIG. 4 is a sectional view similar to FIG. 3 only showing an alternate preferred embodiment; and FIG. 5 is an enlarged fragmented view of a portion of the apparatus shown in FIG. 4.

DETAILED DESCRIPTION OF THE PREFERRED EMBODIMENTS

This disclosure of the invention is submitted in furtherance of the constitutional purposes of the U.S. Pat. Laws "to promote the progress of science and useful arts" (Article 1, Section 8).

Preferred forms of the present invention are illustrated in the drawings, specifically in which FIGS. 1 and 3 illustrate a first preferred form of the present apparatus, and FIGS. 4 and 5 illustrate features of a second preferred form. Both forms are utilized to receive and separate manure and liquids from a slurry received from an infeed source.

The present separator will receive manure in slurry form in which liquids and solids are mixed with water. The present invention is useful, particularly in livestock industries to receive animal waste that is usually washed in a slurry with water and may be pumped or otherwise delivered to the apparatus which is generally shown in the drawings by the reference numeral 10.

When reflushing or separation of water from solids becomes necessary, the present apparatus can be utilized to effectively remove solids from liquids within a collection tank or lagoon. Liquid recovered by the present apparatus can be recycled to the tank or lagoon, or can be received by a convenient form of applicator or spreader mechanism currently being used for applying similarly treated liquids to the ground surface for fertilizer purposes. The solids discharged by the present apparatus can be further dried or collected for use in fertilizer, bedding or feed supplements.

The present separator 10 is shown in FIG. 1 with an upright supporting framework 13. The frame 13 may be appropriately provided to accommodate different ground and lagoon or tank facilities at the separation site.

The frame is generally intended to support an elongated trough 14 of the present invention in a relatively horizontal orientation to receive a slurry at one end and to discharge dewatered solids from an opposite end.

The trough 14 includes an infeed end wall and discharge end wall 15, 16 joined by parallel opposed upright side walls 17. The side walls are joined by bottom walls 18, formed in a particular configuration used to collect liquids from the solid/liquid slurry received by the apparatus.

The trough 14 may be formed of appropriate material such as stainless steel to receive and contain the slurry and the mechanism described below for separating and dewatering solids from the slurry prior to discharge from the discharge end wall 16.

The bottom walls 18 include an infeed section 19 that leads from the infeed end wall 15 toward the discharge end and angularly downward with respect to a horizontal plane. The bottom walls 18 also include a discharge section 20 that leads angularly toward the infeed end and downwardly. The angular relationship of sections 19 and 20 to the horizontal is as shown in FIGS. 1, 3, and in the alternate form in FIG. 4.

The infeed section 19 and discharge section 20 join a bottom drainage section 21 which may be substantially horizontal. A drain 22 opens into the trough through the drainage section 21 to receive separated liquids. The drain may be connected to a conduit for receiving and delivering the liquid to collection lagoons, or to be recycled to the infeed station in order to provide a continuous flow of slurry. However, the apparatus beyond the drain is not within the scope of the present application and can be arranged as desired within the overall waste collection and treatment system.

It is pointed out that the infeed bottom wall section 19 is substantially longer along the length dimension of the trough than the length dimension of the discharge section 20. It is also preferred that the angle of inclination for the infeed section 19 be less than the angular orientation of the discharge section with respect to a horizontal plane. This relationship may be clearly understood with respect to FIG. 3.

A source of slurry such as an infeed weir 24, shown by dashed lines in FIG. 1, may selectively be utilized to supply a slurry to the present apparatus at its infeed station 25. It is preferred that the in-feed station 25 be situated closely adjacent to the infeed end wall 15 to maximize the efficiency of the present apparatus and minimize its overall length dimension.

A drain screen 30 is situated within the trough and spaced above the trough bottom walls. The drain screen includes openings therein for draining fluids to the trough bottom walls below. In the preferred forms, the drain screen 30 may be comprised of a perforated metal plate, preferably stainless steel (in which the open area produced by the screen openings is between 28 and 45 per cent of the screen surface.

In the preferred forms, the drain screen 30 extends the full length dimension of the trough 14 and includes differentially inclined infeed and discharge sections 31, 32. Sections 31, 32 are angularly oriented in a manner similar to the angular orientation of the trough bottom walls. However, in the preferred forms, the discharge section 32 of the screen will overlap the drainage section 21 and discharge section 20 of the bottom walls 18.

The angular orientation of the screen discharge section 32 may also vary somewhat from the angular orientation of the bottom wall discharge section. However, the angular orientation is somewhat similar to that of the bottom wall sections. Specifically, the preferred angle of the screen discharge section 32 is greater than the angular orientation of the screen infeed section 31.

A relationship of length dimensions of the screen sections is of importance in the separation capabilities of the present apparatus. In the preferred forms, the length dimension of the infeed section 31 as indicated by dimension "X" in FIG. 3 is approximately twice the length dimension of the discharge section which is indicated in FIG. 3 by the dimension "Y". It has been found that the angular orientation of these two screen sections, and the relationship of the length dimensions of the two, facilitate a maximum degree of separation and dewatering with a minimum overall length of the entire separator apparatus 10.

The angular orientation of the screens is within the range of 5° to 30° from a horizontal plane. In a preferred orientation, the infeed screen 31 is at a smaller angle than the discharge screen. Thus, for example, the infeed screen may be set at an angle of approximately 7° while the discharge screen is set at an angle of approximately 10°.

In the preferred forms, the infeed screen section 31 is substantially parallel to and spaced upwardly from the infeed bottom wall section 19. The amount of separation varies with the overall length of the infeed section.

However, a range would be between approximately two inches for infeed screen section length dimensions of up to 15 feet; three inches for infeed screen section lengths from 15 to 25 feet; and four inches after 25 feet.

The distance referred to above is fairly consistent along the trough between the bottom trough infeed wall 19 and the infeed section of the screen. This dimension is increased between the discharge section of the screen and the discharge section of the trough bottom wall. This is done to facilitate the dewatering process along the upwardly inclined discharge section by separating the solids moving on the discharge screen section from the water collected below. Inclination of the discharge wall section is also provided to facilitate "sloshing" of separated liquids upwardly onto the wall to collect fines discharged through the discharge screen section, and to wash them into the drain 22.

The drain screen sections 31, 32 converge at a junction 33 within the trough. An overflow 34 is advantageously positioned at the juncture 33 to catch and discharge any liquids that might otherwise raise to an elevation above the converging screen sections 31, 32. This is done to prevent any liquids from rising above the screen sections to hamper the dewatering function taking place along the length of the discharge screen section 32.

An endless paddle conveyor 40 is provided on the frame and includes a working flight powered to move and scrape along the drain screen sections from the infeed end of the trough to the discharge end. More specifically, the paddle conveyor 40 includes paired opposed longitudinal drive chains 41 with interconnecting paddles 42. The paddles 42 are substantially transverse to the length dimension of the trough.

The chains 41 are trained around an infeed idler 43 at the in-feed end of the frame, and a drive sprocket assembly 44 at the discharge end. A conventional conveyor drive assembly 45 may be provided on the frame or mounted to the side of the trough to selectively drive the chain conveyor with the working flight moving from the infeed end of the trough, downwardly and along the infeed section of the drain screen 30 and subsequently upwardly over the discharge screen section 32.

The paddles 42 have a desired height dimension of between 1.5 and 3 inches. A preferred height dimension is 2 inches. The height dimension is significant in that paddles of too much height will collect significant amounts of water in the slurry behind their downwardly moving surfaces. The water will then weigh against solids in the area behind the paddle and press the solids into the screen, plugging the openings.

There is also a desired spacing between successive paddles along the conveyor. The spacing is consistent from one paddle to the next, and is within a range of eight to 20 inches. Within this range, a preferred separation is 10 inches between successive paddles.

The operating speed of the conveyor is also significant. A preferred operating speed is within a range of 10 to 45 feet per minute for the paddles moving along the working flight. Within this range, a preferred speed is 40 feet per minute.

FIG. 2 illustrates a detail of a portion of the paddle conveyor 40 and a paddle 42 in relation to the drain screen 30. The paddle shown is exemplary of the remaining paddles on the conveyor which are all substantially identical. The paddles 42 are all preferably formed of a relatively strong yet low friction material such as ultra high molecular weight (UHMW) plastics.

As shown in FIG. 2, the individual paddles include bottom reduced edges 46 for moving against the drain screen surfaces. These edges are reduced in contact surface in order to minimize the friction against the screen surface and to avoid binding with solids as the paddles are moved along. The reduced cross sectional dimension of the bottom paddle edges increases the pressure per square inch on the contact area of the screen, thereby firmly pressing any solids that become wedged between the paddle and the screen, into and through the screen openings. However, the solids are typically maintained in a rolling, tumbling, cascading fashion between successive paddles as the paddles are moved downwardly along the infeed section of the drain screen and subsequently upwardly over the discharge section. Primary separation is caused by motion of the slurry and solids solution along the screen section as opposed to a squeezing function between the paddle and the screen.

The paddles are held in the sliding, scraping relationship with the screen by elongated guides 48 situated along the opposed side walls of the trough. These guides serve to configure the chain to confirm with the angular orientation of the infeed and discharge surfaces of the drain screen 30.

An alternate chain configuration is shown in the embodiment illustrated in FIGS. 4 and 5. Here, the return flight 51 of the chain is situated below the screen. A guide strip 52 is provided to hold the chain and paddles above the bottom wall of the trough as the chain returns to the infeed end. In this configuration, the paddles on the returns flight are clear of the upward open surfaces of the trough and facilitate access to the screen surfaces and the paddles moving along the working flight.

In operation, solids and liquids are delivered in a slurry through the weir or other appropriate infeed provisions to the infeed station 25. The slurry is allowed to flow down the length of the in-feed section of the drain screen, tumbling over and cascading over the paddles 42.

As the slurry is fed in and runs down the infeed side of the screen, the paddles are simultaneously moved in the downward direction to encourage the downward flow and to mildly obstruct the passage of the slurry so that a churning and tumbling effect is produced wherein separation of approximately 80% of the solids occurs. Liquids separated from the solids will drain through the openings of the drain screen on the infeed section 31. This collected liquid will move by gravity down the inclined bottom infeed wall section 19 to the drain 22.

As the conveyor paddles move upwardly along the discharge screen section 32, the solids are dewatered, the liquids and water dripping through the drain screen openings to the inclined discharge section 20 of the bottom trough wall below. This trough wall will collect fines from the dewatering solids. The bottom wall section 20 will be cleaned and washed by the water and other liquids washing up the discharge bottom wall section 20 due to inertia from running down the infeed bottom wall section. The water will "slosh" up on this surface and clean the fines before running downwardly to be discharged through the drain 22. Should it occur that excessive slurry be provided through the infeed end and the water and liquid level build up to a level that would normally extend above the juncture 33 between the infeed and discharge drain screen sections, such overflow will be received and drained from the trough by the overflow opening 34.

The paddles moving up the discharge section of the screen move the solids upwardly clear of the liquids and allow extended dewatering. The length dimension of the discharge section of the screen is considered sufficient to facilitate the dewatering process before the solids are discharged into a press roll such as indicated at 60 in FIG. 1 and disclosed in detail in my prior patent, U.S. Pat. No. 4,666,602.

Operation of the alternate form illustrated in FIGS. 4 and 5 is essentially the same as described above. The separation process and dewatering process for the alternate form are substantially the same as for the preferred form discussed above. The primary difference is that the return flight is trained along the bottom walls of the trough as opposed to across the top sides thereof as shown in FIG. 1.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A mature separator for receiving and separating manure and liquids received in a slurry from an infeed source, comprising:

a frame;

an elongated trough on the frame extending from an infeed end to a discharge end, and having upright side walls joined by end walls, and bottom walls;

wherein the bottom walls are inclined, with respect to a horizontal plane, and include an infeed section leading angularly downward and toward the discharge end and a discharge section leading angularly downwardly from the discharge end and toward the infeed end;

a drainage section joining the infeed and discharge bottom wall sections;

a drain opening in the trough at the drainage section;

a drain screen within the trough spaced above the trough bottom walls and having openings therein for draining fluids to the trough bottom walls;

wherein the drain screen includes infeed and discharge screen sections downwardly converging at a common intersection, with the infeed screen section extending angularly downward along and above the trough bottom wall infeed section toward the drainage section, and the discharge screen section extending angularly downward along and above the trough bottom wall discharge toward the drainage section;

wherein the infeed screen section is approximately twice the length of the discharge screen section; and an endless paddle conveyor adjacent to and extending along the drain screen and having a flight powered means for moving and scraping along the drain screen sections from the infeed end of the trough to the discharge end.

2. A manure separator for receiving and separating manure and liquids received in a slurry from an infeed source, as claimed by claim 1 wherein the bottom wall infeed section of the trough and the infeed section of the drain screen are substantially parallel.

3. A manure separator for receiving and separating manure and liquids received in a slurry from an infeed source, as claimed by claim 1 wherein the bottom wall infeed section of the trough and the infeed section of the drain screen are substantially parallel; and wherein the drain screen infeed section is spaced from the bottom wall infeed section by a distance of approximately 2 to 4 inches.

4. A manure separator for receiving and separating manure and liquids received in a slurry from an infeed source, as claimed by claim 1 wherein the drain screen discharge section longitudinally overlaps a portion of the bottom wall drainage section and is spaced above the bottom wall drainage section and bottom wall discharge section by a distance greater than the spacing between the bottom wall infeed section and the infeed screen section.

5. A manure separator for receiving and separating manure and liquids received in a slurry from an infeed source, as claimed by claim 1 wherein the drain screen infeed section is inclined from the horizontal by an angle of approximately 5°-30° from a horizontal plane.

6. A manure separator for receiving and separating manure and liquids received in a slurry from an infeed source, as claimed by claim 1 wherein the drain screen discharge section is inclined from the horizontal by an angle of approximately 5°-30° from a horizontal plane.

7. A manure separator for receiving and separating manure and liquids received in a slurry from an infeed source, as claimed by claim 1 wherein the screen infeed and discharge sections are inclined from the horizontal by converging angles of approximately 5°-30°.

8. A manure separator for receiving and separating manure and liquids received in a slurry from an infeed source, as claimed by claim 1 wherein the drain screen infeed section is inclined at an angle from the horizontal and the discharge section is inclined from the horizontal by a greater angle than that of the drain screen infeed section.

9. A manure separator for receiving and separating manure and liquids received in a slurry from an infeed source, as claimed by claim 1 further comprising a overflow discharge at the confluence of the drain screen infeed and discharge sections.

10. A manure separator for receiving and separating manure and liquids received in a slurry from an infeed source, as claimed by claim 1 wherein the angle of the discharge section of the bottom wall is greater than the angle of the infeed section of the bottom wall.

11. A manure separator for receiving and separating manure and liquids received in a slurry from an infeed source, as claimed by claim 1 wherein the paddle conveyor includes a return flight extending along the trough above the drain screen.

12. A manure separator for receiving and separating manure and liquids received in a slurry from an infeed source, as claimed by claim 1 wherein the paddle conveyor includes a return flight extending along the trough between the drain screen and the bottom walls of the trough.

13. A manure separator for receiving and separating manure and liquids received in a slurry from an infeed source, as claimed by claim 1 wherein the paddle conveyor includes successively spaced paddles driven to move along the drain screen at a rate of between approximately 10 and 45 feet per minute.

14. A manure separator for receiving and separating manure and liquids received in a slurry from an infeed source, as claimed by claim 1 wherein the paddle conveyor includes chains driving spaced apart paddle members and wherein the spacing between successive paddle members is approximately 8 to 20 inches.

15. A manure separator for receiving and separating manure and liquids received in a slurry from an infeed source, as claimed by claim 1 wherein the paddle conveyor includes chains driving spaced apart paddle members and wherein the spacing between successive paddle members is approximately 10 inches.

16. A manure separator for receiving and separating manure and liquids received in a slurry from an infeed source, as claimed by claim 1 wherein the paddle conveyor includes driven paddle members having height dimensions of between approximately 1.5 and 3 inches.

17. A manure separator for receiving and separating manure and liquids received in a slurry from an infeed source, as claimed by claim 1 wherein the paddle conveyor includes driven paddle members having height dimensions of approximately 2 inches.

18. A manure separator for receiving and separating manure and liquids received in a slurry from an infeed source, as claimed by claim 1 wherein the paddle conveyor includes driven paddle members having height dimensions of approximately 2 inches;
   wherein the paddle members are spaced apart by distances of approximately 10 inches; and
   wherein the drain screen sections are angularly offset from the horizontal by an angle of approximately 5°–30°.

19. A manure separator for receiving and separating manure and liquids received in a slurry from an infeed source, as claimed by claim 1 wherein the paddle conveyor includes driven paddle members having height dimensions of approximately 2 inches;
   wherein the paddle members are spaced apart by distances of approximately 10 inches;
   wherein the drain screen sections are angularly offset from the horizontal by angles of approximately 5°–30°; and
   wherein the paddles are driven at a rate of approximately 40 feet per minute.

* * * * *